Patented June 10, 1930

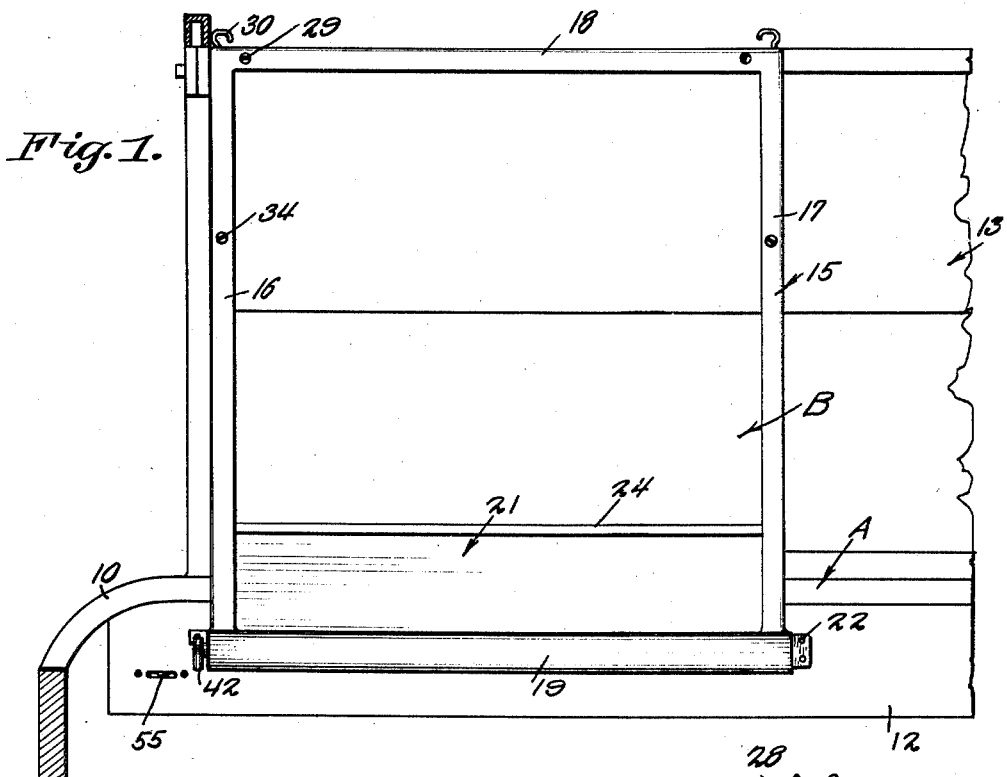
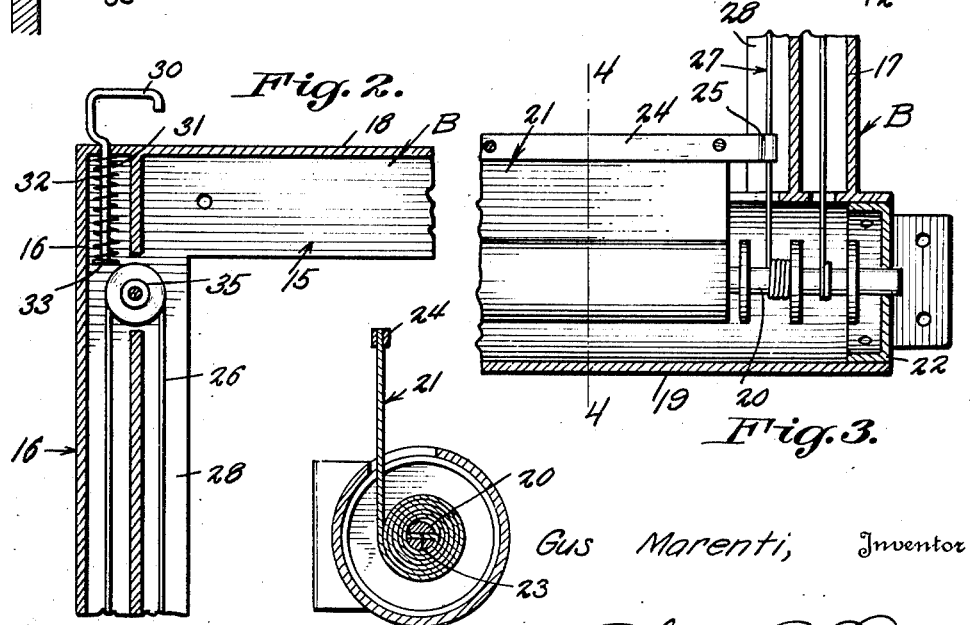

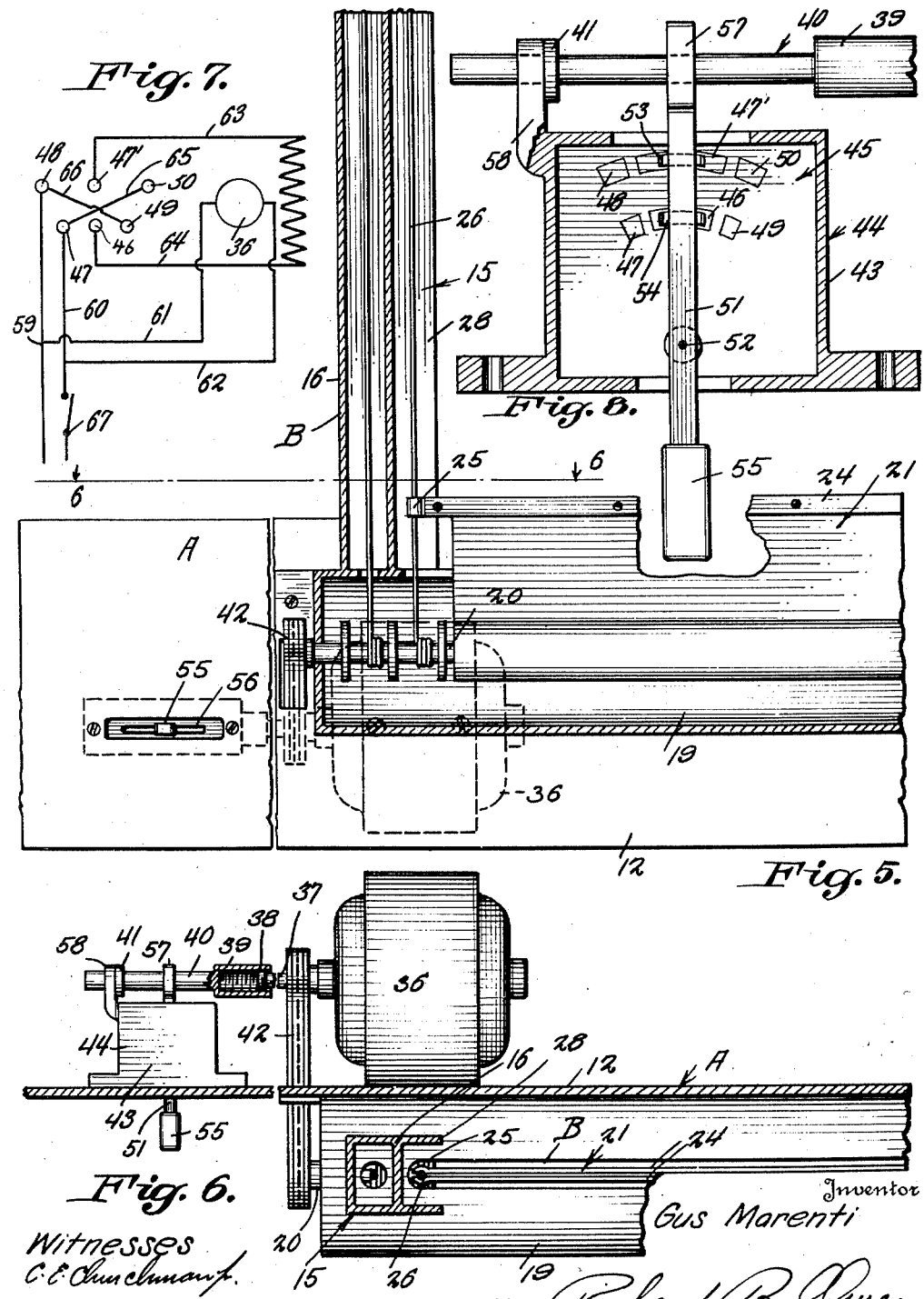

1,762,480

UNITED STATES PATENT OFFICE

GUS MARENTI, OF WASHINGTON, DISTRICT OF COLUMBIA

ANTIGLARE ATTACHMENT

Application filed February 23, 1927. Serial No. 170,382.

This invention appertains to novel antiglare attachments for vehicles.

One of the primary objects of the present invention is to provide an anti-glare attachment which can be readily moved into and out of operation at the will of the driver in a convenient and expeditious manner.

Another salient feature of the invention is the provision of an anti-glare attachment for automobiles for facilitating the driving thereof in night time against oncoming vehicles and in the daytime against the glare of the sun, the device embodying a flexible anti-glare element wound upon a suitable roller with means for moving the element into and out of operative position.

A further object of the invention is the provision of novel means for automatically raising and lowering the flexible anti-glare shield into and out of operative position including a reversible motor operatively connected with the roller and a novel switch for controlling the direction of rotation of the motor.

A further object of the invention is the provision of novel means for incorporating the anti-glare attachment with a conventional automobile whereby the operative mechanism of the attachment will be normally hid from view.

A still further object of the invention is to provide an improved attachment of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which:

Figure 1 is a fragmentary vertical section through an automobile looking toward the front thereof showing the improved antiglare attachment incorporated therewith.

Figure 2 is an enlarged vertical section through one upper corner of the frame of the attachment.

Figure 3 is a similar section taken through the lower inner corner of the frame.

Figure 4 is a detail section taken on the line 4—4 of Figure 3 showing the novel means of removably connecting the flexible antiglare element to the roller and the lifting and lowering bar.

Figure 5 is an enlarged fragmentary rear elevation of the attachment showing parts thereof in section and illustrating the operating mechanism for the attachment and the means incorporating the switch thereof with the dash or instrument board of the automobile.

Figure 6 is a horizontal section taken on the line 6—6 of Figure 5 looking in the direction of the arrows.

Figure 7 is a diagrammatic view showing the wiring for the switch and motor, and Figure 8 is an enlarged plan view of the switch and the novel connection thereof with the operating motor.

Referring to the drawings in detail, wherein similar reference characters designate corresponding parts throughout the several views, the letter A indicates an automobile and B the novel anti-glare attachment incorporated therewith.

The automobile A is of any conventional character and includes the body 10, the instrument or dashboard 12 and the windshield 13.

By way of illustrating my invention, I have shown the attachment movable vertically, but it is to be understood that the same can move horizontally across the vehicle, and the improved attachment B comprises a rectangular frame 15 which is fitted on the windshield directly in front of the driver. This frame 15 includes side pieces 16 and 17, the top connecting piece 18 and the bottom connecting piece 19 which is in the form of a casing for housing the various parts of the operating mechanism as will be later described. The bottom piece or housing 19 supports suitable bearings for rotatably supporting a shaft or roller 20 upon which is wound the flexible anti-glare element 21. This antiglare element 21 can be formed of celluloid or any other desired flexible transparent material. This element can be of any desired color best suited for the purpose intended, such as amber, green, blue or red. It is preferred to so mount the roller and to connect the antiglare element therewith in such a way that the roller can be removed and the anti-glare element renewed when worn out. To carry out this idea one end wall 22 of the casing 19 is made removable so that the roller can be pulled out from the open portion of the casing. The roller or shaft 20 is slotted as at 23 to receive the inner end of the shade or antiglare shield. The free end of the shade or anti-glare shield is clamped between a pair of rods 24 the ends of which terminate in clamping jaws 25 for engaging the lifting or raising cords 26 and 27 which are arranged on the opposite sides of the frame. It is to be noted at this point that the side members 16 and 17 are of hollow construction and have their inner edges provided with guides 28 for receiving the terminals of the clamping rods or strips 24.

The frame 15 can be secured to the windshield in any desired way, such as by the use of fastening elements 29 which extend through the upper frame bar into the windshield or some other suitable portion of the top of the automobile or if preferred hanging hooks 30 can be provided for hooking over the top of the windshield. These hooks 30 are provided with elongated shanks 31 which are slidably mounted in the side frame bars 16 and 17 around which are trained expansion springs 32. The expansion springs 32 are confined between the top frame bar 18 and heads 33 formed on the shanks and these springs normally tend to draw the hooks 30 downward.

If preferred suitable pads or adjustable screws 34 can be provided for engaging the glass of the windshield so as to prevent rattling of the frame 15 thereon. It is to be noted that the lower end of the frame extends down over the instrument or dashboard 12.

Novel means is employed for raising and lowering the shade or anti-glare shield 21 and this means includes the shaft or roller 20 and the lifting cords 26 and 27. The lifting cords 26 and 27 have their intermediate portions trained over guide pulleys 35 carried by the side pieces of the frame adjacent to the upper ends thereof. The lower ends of the lifting cords are wound about the shaft or roller in opposite directions so that as one stretch of each cord is wound upon the roller the other stretch will be unwound therefrom.

The means employed for rotating the roller or shaft 20 embodies a reversible electric motor 36 which is preferably disposed in rear of the dashboard or instrument board 12. The armature shaft 37 of the motor is extended and is provided with a feed screw 38 which is threaded into a feed nut 39, so that the nut will be moved toward or away from the motor according to the direction of rotation thereof. The feed nut 39 carries an operating rod 40 having a stop collar 41 adjacent to the outer end thereof and the feed nut 39 functions as another stop collar as will be later described. A sprocket wheel is keyed or otherwise secured to the armature shaft of the motor and a similar sprocket wheel is keyed or otherwise secured to the roller 20. These sprocket wheels are connected together by a sprocket chain 42. Of course any other desired means of driving connection between the motor and the roller 20 can be had.

A reversing switch 43 is provided and is also preferably arranged in rear of the dashboard 12 adjacent to the motor. This switch 43 embodies a suitable housing 44 bolted or otherwise connected to the dashboard and the housing can be made of insulating material or a base plate 45 of insulating material can be arranged in the housing. Embedded in the base plate 45 at the central portion thereof is a pair of spaced contact pieces 46 and 47' and arranged on each side of the contact pieces 46 and 47' are contact pieces 47 and 48 and 49 and 50 respectively. A manipulating switch lever 51 is rockably connected as at 52 at a point intermediate its ends in the housing and it is provided with resilient brushes or bridge pieces 53 and 54. The rear end of the switch lever is provided with a manipulating handle 55 which is extended through a suitable slot 56 formed in the instrument board 12. The inner end of the switch lever 51 is provided with a yoke 57 which straddles the rod 40 intermediate the stop shoulder 41 and the feed nut 39. It is to be noted that the housing can be provided with a suitable guide 58 for the rod 40.

In Figure 7 is illustrated one circuit for the switch and motor, in which 59 and 60 represents the feed wires. These feed wires have connected respectively therewith branch wires 61 and 62 which lead to the armature of the motor. Wires 63 and 64 are connected with the field of the motor and to the contact pieces 46 and 47'. The contact pieces 47 and 50 are electrically connected together by a wire 65 while the contact pieces 48 and 49 are connected by a wire 66. When the switch lever is in its neutral position as shown in Figure 5 of the drawings the bridge pieces 53 and 54 will engage only the contact pieces 46 and 47', however when the switch lever is swung to the right or left, as the case may be, the bridge pieces will engage the contacts 46 and 47' and the contacts 47 and 48 or 49 and 50. It can be seen that the direction of flow of current through the field will be reversed according to the movement of the switch lever through the field of the motor and thus consequently bring about the reversing of the motor. When the device is not to be used for a considerable length of time a switch 67 located in the line wire 60, can be opened.

In operation of the improved device, when it is desired to raise the shield to its operative position in front of the eyes of the driver the switch lever 51 is moved so as to bridge the contacts 46 and 47 and 47' and 48. The motor will now start operating and the roller will be turned in a direction to pull up on the rods 24. During the rotation of the roller the nut 39 will be fed in on the screw 38 and at the time the anti-glare shield 21 has been moved to its complete raised position the stop collar 41 will engage the yoke 57 and move the lever off of the contacts 47 and 48 and thus stop the rotation of the motor.

When it is desired to lower the shield 21 it is merely necessary for the operator to throw the switch lever over in an opposite direction from that previously contemplated and the contacts 46 and 49 and 47' and 50 will be bridged. This will cause the motor to reverse and the roller will be rotated in a direction to pull down on the rods 24. At the time the shade has reached its completed lowered position the nut 39 will have been fed outward into engagement with the yoke 57 of the switch lever and the switch lever will be moved off of the contacts 49 and 50 and thus bringing about the stopping of the motor.

From the foregoing description it can be seen that I have provided an exceptionally simple and durable anti-glare shield for motors which can be moved into an operative or inoperative position by the mere movement of a switch by the driver of the vehicle.

It is to be noted that the anti-glare attachment only covers a part of the wind shield and lies in rear of the left headlight only leaving the right headlight to properly illuminate the road and give the driver clear vision to see the road.

Changes in details may be made without departing from the spirit or scope of this invention, but:

What I claim as new is:

1. An anti-glare shield for automobiles comprising a frame, means for connecting the frame with the windshield of an automobile, a roller rotatably carried by the frame, a flexible transparent colored shield wound upon the roller, lifting cables disposed on the opposite sides of the frame having their intermediate portions trained about guide rollers, the opposite ends of the cords being wound upon the roller in opposite directions, means for rotating the roller in opposite directions, and means for securing the free end of the shade to the cords.

2. An anti-glare shield for automobiles comprising a guide frame, a rotatable roller supported by the frame, a shade of transparent colored material wound upon the roller, raising and lowering cables carried by the opposite sides of the frame having their intermediate portions trained about guide rollers, the ends of the cables being trained about the roller in opposite directions, means for rotating the roller, clamping rods detachably engaging the free end of the shade, and clamping jaws carried by the clamping rods for detachable engagement with the cables.

3. An anti-glare attachment for automobiles comprising an open rectangular frame, supporting hooks resiliently and slidably mounted on the frame, a roller rotatably carried by one end of the frame, a flexible transparent shade normally wound upon the roller, lifting cables disposed on the opposite sides of the frame, guide rollers carried by the frame over which the cables are trained, the opposite ends of each cable being wound about the roller in opposite direction, means for detachably connecting the free end of the shade with the cables, a reversible motor, means operatively connecting the motor with the roller, and a control switch for the motor.

4. An anti-glare attachment for automobiles comprising an open rectangular frame including hollow upright side pieces and a casing connecting the side pieces together, the side pieces functioning as guides, a roller rotatably mounted within the casing, a flexible transparent shade normally wound upon the roller, guide pulleys carried by the upper ends of the side pieces, flexible cables trained over the pulleys and having their opposite terminals wound in opposite directions upon the roller, means securing the free end of the shade to one stretch of each cable, and means for rotating the roller.

5. An anti-glare attachment for automobiles comprising an open rectangular frame, a roller rotatably carried by one end of the frame, a flexible transparent shade normally wound upon the roller, lifting cables disposed on the opposite sides of the frame, guide rollers carried by the frame over which the cables are trained, the opposite ends of each cable being wound about the roller in opposite direction, means for detachably connecting the free end of the shade with the cables, a reversible motor, means operatively connecting the motor with the roller, and a control switch for the motor.

In testimony whereof I affix my signature.

GUS MARENTI.